(12) United States Patent
Chen et al.

(10) Patent No.: US 8,151,995 B2
(45) Date of Patent: Apr. 10, 2012

(54) METHODS AND APPARATUS TO PREVENT MOLD COMPOUND FEEDER JAMS IN SYSTEMS TO PACKAGE INTEGRATED CIRCUITS

(75) Inventors: Chih-Chung Chen, Chung Ho (TW); Chih-Hsien Lin, Taipei (TW); Tsung-Chi Chiang, Hsin Kang Hsiang (TW)

(73) Assignee: Texas Instruments Incorporated, Dallas, TX (US)

( * ) Notice: Subject to any disclaimer, the term of this patent is extended or adjusted under 35 U.S.C. 154(b) by 721 days.

(21) Appl. No.: 12/025,332

(22) Filed: Feb. 4, 2008

(65) Prior Publication Data
US 2009/0194896 A1     Aug. 6, 2009

(51) Int. Cl.
*B07C 5/00* (2006.01)
(52) U.S. Cl. .................. 209/597; 209/523
(58) Field of Classification Search .......... 209/539, 209/540, 586, 597, 522–524; 264/40.1
See application file for complete search history.

(56) References Cited

U.S. PATENT DOCUMENTS

| | | | | |
|---|---|---|---|---|
| 3,506,840 A * | 4/1970 | Fink | | 250/223 B |
| 3,730,325 A * | 5/1973 | Goodwin | | 198/395 |
| 3,797,195 A * | 3/1974 | Brink et al. | | 53/471 |
| 3,982,865 A * | 9/1976 | Adams et al. | | 425/149 |
| 4,784,493 A * | 11/1988 | Turcheck et al. | | 356/394 |
| 5,015,841 A * | 5/1991 | Hoppmann et al. | | 250/223 R |
| 5,411,170 A * | 5/1995 | Boschman | | 221/167 |
| 5,509,539 A * | 4/1996 | Hoang et al. | | 209/634 |
| 5,656,305 A * | 8/1997 | Venrooij | | 425/145 |
| 5,675,516 A * | 10/1997 | Bone et al. | | 702/104 |
| 5,755,074 A * | 5/1998 | Fetters | | 53/69 |
| 5,770,128 A * | 6/1998 | Kobayashi et al. | | 264/39 |
| 5,888,443 A | 3/1999 | Bolanos | | |
| 6,033,614 A | 3/2000 | Bolken | | |
| 6,971,863 B2 * | 12/2005 | Park et al. | | 425/116 |
| 7,014,032 B2 * | 3/2006 | Franzaroli | | 198/399 |
| 7,029,257 B2 * | 4/2006 | Lee et al. | | 425/116 |
| 7,134,460 B2 * | 11/2006 | Kaplan et al. | | 141/200 |
| 7,169,345 B2 | 1/2007 | Murugan | | |
| 7,248,373 B2 * | 7/2007 | Pellerin et al. | | 356/601 |
| 7,258,222 B2 * | 8/2007 | Marti Sala et al. | | 198/393 |
| 7,431,583 B2 * | 10/2008 | Takatsugi et al. | | 425/587 |
| 7,556,137 B2 * | 7/2009 | Charpentier | | 198/395 |
| 2004/0168887 A1 * | 9/2004 | Franzaroli | | 198/395 |
| 2009/0103110 A1 * | 4/2009 | Ferlet | | 356/635 |
| 2010/0258405 A1 * | 10/2010 | Ackley et al. | | 198/340 |
| 2011/0193573 A1 * | 8/2011 | De Boer et al. | | 324/686 |

FOREIGN PATENT DOCUMENTS

JP         08014838 A * 1/1996

OTHER PUBLICATIONS

English Translation of Shibue et al., JP 08014838A, Jan. 1996.*

* cited by examiner

*Primary Examiner* — Joseph C Rodriguez
(74) *Attorney, Agent, or Firm* — Steven A. Shaw; W. James Brady; Frederick J. Telecky, Jr.

(57) ABSTRACT

Methods and apparatus to preventing mold feeder jams in a system to package integrated circuits. An example method includes detecting if a mold compound tablet has a first alignment on a path and removing the mold compound tablet from the path if the mold compound tablet has a second alignment different from the first alignment.

17 Claims, 5 Drawing Sheets

FIG. 8

METHODS AND APPARATUS TO PREVENT MOLD COMPOUND FEEDER JAMS IN SYSTEMS TO PACKAGE INTEGRATED CIRCUITS

FIELD OF THE DISCLOSURE

The present disclosure relates generally to semiconductor packaging and, more particularly, to methods and apparatus to prevent mold compound feeder jams in systems to package integrated circuits.

BACKGROUND

In many electrical devices and systems, an integrated circuit is not directly attached to a circuit board. Rather, the integrated circuit is packaged into a housing to facilitate placing the integrated circuit on the circuit board and to protect the integrated circuit from the environment. The housing must be formed over the integrated circuit without damaging it or any of its associated bond wires. Generally, a packaged integrated circuit is attached to conductive lines on the circuit board of the electrical device or system via exposed contacts (e.g., electrical leads, etc.) on the packaged integrated circuit.

A transfer mold process is used to encapsulate an integrated circuit without damaging the integrated circuit or its associated bond wires. In such a transfer mold process, a mold compound feeder conveys mold compound tablets to a plunger of a mold system. The mold compound tablet may be an epoxy resin, for example. The plunger liquefies the mold compound tablet and injects the liquid mold compound into a mold chase. The mold chase includes a plurality of cells, each of which contains one or more integrated circuits attached to at least one substrate. As the plunger injects the liquid mold compound into the mold chase, the liquid mold compound flows into the cells and encapsulates the integrated circuits contained therein. After encapsulating the integrated circuits, the mold cures and solidifies, thereby encapsulating the integrated circuit in a rigid material to protect the integrated circuits and their bond wires from the environment.

Generally, mold compound tablets are stored in a mold compound supply of the mold system. A mold compound feeder is also included in the mold system to receive mold compound tablets from the mold compound supply. The mold compound feeder conveys the mold compound tablets to the plunger. However, the mold system may experience jams in the devices of the mold system (e.g., a preheater, etc.), creating a need for maintenance and halting the transfer mold process.

SUMMARY

Methods and apparatus to prevent mold compound feeder jams in a transfer mold process to encapsulate an integrated circuit are disclosed herein. An example method to prevent mold compound feeder jams includes detecting if a mold compound tablet has a first alignment on a path, and removing the mold compound tablet from the path if the mold compound tablet has a second alignment. In some examples, the mold compound tablet is removed from the path if it is aligned on its radial axis. However, in other examples, the mold compound tablet is removed from the path if it is aligned on its longitudinal axis.

DETAILED DESCRIPTION

Example methods and apparatus to prevent mold compound feeder jams are disclosed herein. Although the example methods and apparatus described herein generally relate to mold compound feeders employed in a semiconductor device fabrication process, the disclosure is not limited to mold compound feeders or to semiconductor device fabrication. On the contrary, the teachings of this disclosure may be applied to any device or system that would benefit from preventing jams.

Figure 1:
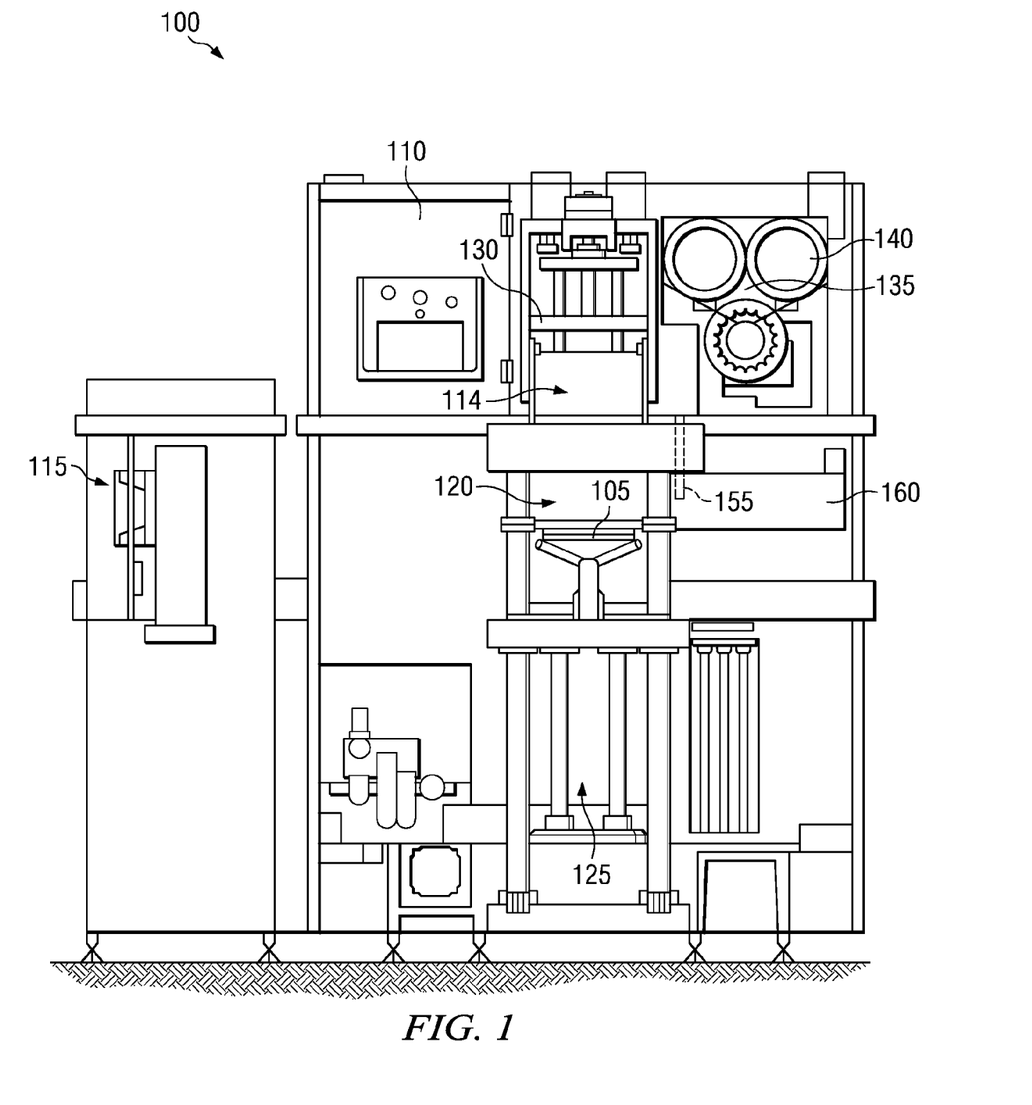
FIG. 1 illustrates an example mold system.

FIG. 1 illustrates an example mold system 100 that, in general, melts substantially cylindrically shaped mold compound tablets to create liquid mold compound used to encapsulate integrated circuits. That is, the mold system 100 receives mold chase sections 105, 107 that form a plurality of cells containing integrated circuits (not shown) and associated components (e.g., bond wires, substrates, etc.) and injects the liquid mold compound into the cells of the mold chase sections 105, 107. The liquid mold compound solidifies to form a packaged integrated circuit, which, is subsequently ejected from the mold chase section 105.

The example mold system 100 includes a mold system controller 110 to configure and control the operation of the mold system 100 such as, for example, a mold chase transporter 115 that loads and positions the mold chase section 105 in the mold system 100. In the illustrated example, the mold system controller 110 instructs the mold chase transporter 115 to move the mold chase section 105 containing the integrated circuits below the mold chase section 107 of the mold system 100. A mold press 125 is actuated to seal the mold chase sections 105, 107 together to form cells in which the integrated circuits are contained. After forming the cells to contain the integrated circuits, a plunger 130 transfers liquid mold compound (e.g., a heated epoxy resin, etc.) to the cells of the mold chase sections 105, 107.

In the example of FIG. 1, the plunger 130 receives a mold compound tablet (not shown) and pressurizes and heats the mold compound tablet, causing the mold compound tablet to turn into liquid mold compound. The pressure from the plunger 130 forces the liquid mold compound into the cells formed by the chase sections 105, 107 to encapsulate the integrated circuits disposed therein in the liquid mold compound. After encapsulating the integrated circuits, the liquid mold compound cures and solidifies, thereby separately encapsulating each of the integrated circuits in a rigid material.

Figure 2:
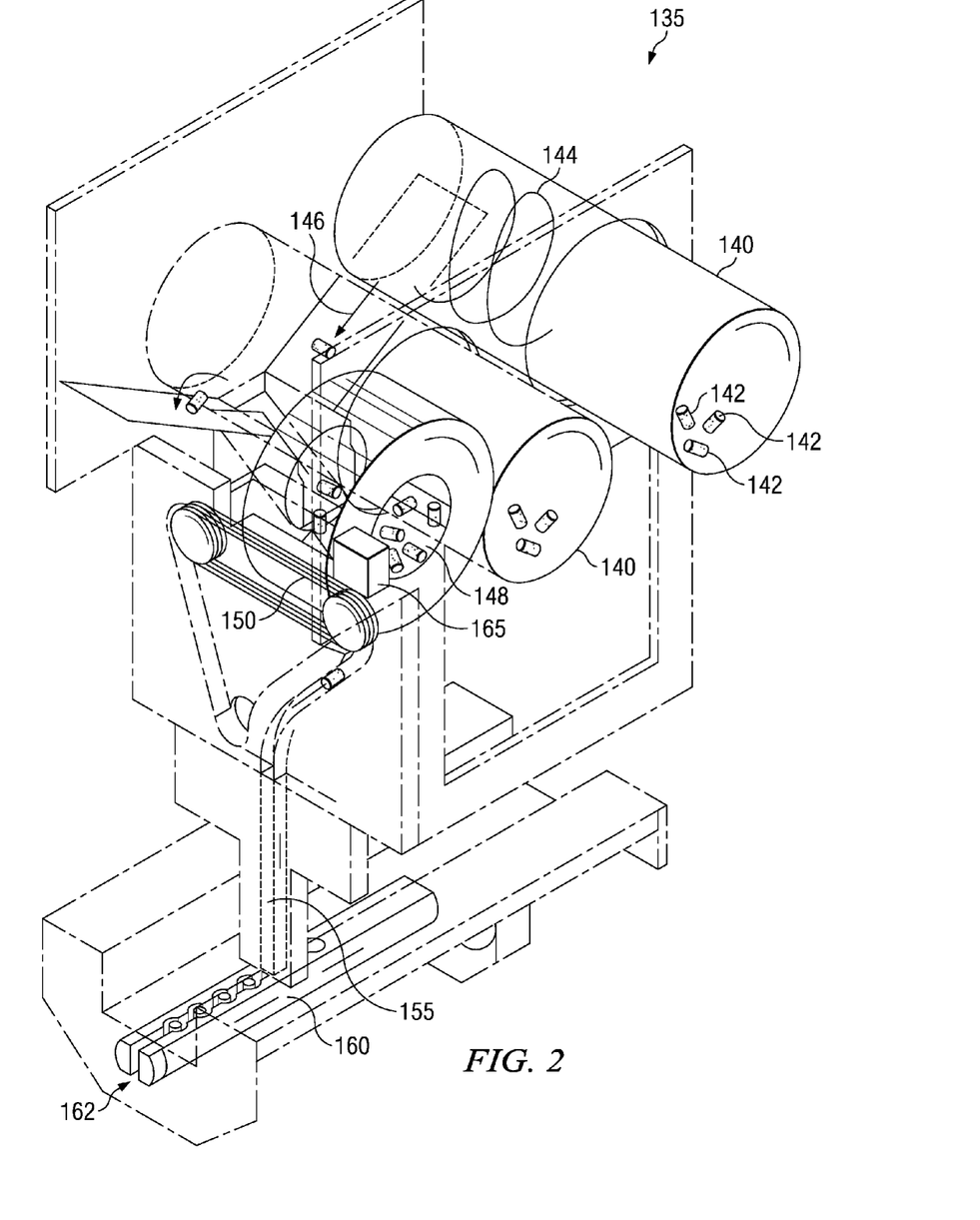
FIG. 2 illustrates a mold compound feeder of the mold system of FIG. 1 in more detail.

To automate the mold system 100, the mold system 100 includes a mold compound feeder 135 to convey mold compound tablets to the plunger 130, one of which is shown in further detail in FIG. 2. A mold compound feeder 135 includes one or more mold compound supplies 140 to hold one or more mold compound tablets 142. In some examples, additional mold compound supplies 140 are included to allow an operator to refill an empty mold compound supply 140 without interrupting the operation of the example mold system 100.

The mold compound supply 140 includes a spiral wall 144 that directs the mold compound tablets 142 into a chute 146. The mold compound tablets 142 are received by a rotating cage 148 via the chute 146. As the cage 148 rotates, it aligns the mold compound tablets 142. In some examples, the mold compound tablets 142 may be cylindrical and the cage 148 may align the mold compound tablets 142 on their longitudinal axis. After aligning the mold compound tablets 142, the mold compound tablets 142 are received by a conveyer belt 150, which conveys the mold compound tablets 142 having their longitudinal axes substantially aligned and parallel with the conveyer belt 150.

A mold compound separator 155 separates the mold compound tablets 142 and conveys the mold compound tablets 142 to a mold compound transporter 160. In the illustrated example, the mold compound transporter 160 receives the mold compound tablets 142 on their radial axes such that their longitudinal axes are substantially perpendicular to a path 162 of the mold compound transporter 160. The mold compound transporter 160 further conveys the mold compound tablets 142 to other devices of the mold system 100 via the path 162 for further processing (e.g., preheating, etc.).

Figure 3:
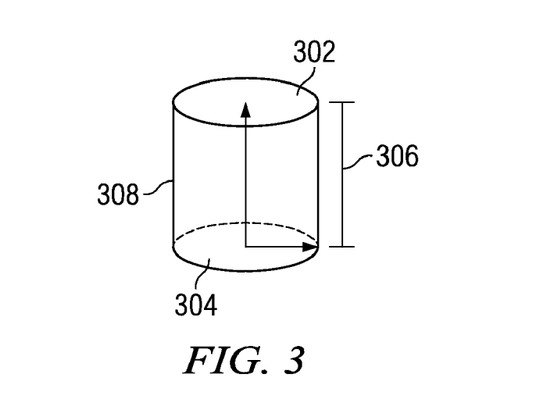
FIG. 3 illustrates an example mold compound tablet.

Sometimes mold compound tablets 142 are not properly oriented or properly sized. In the example mold system 100, the mold compound tablets 142 are generally cylindrical having a substantially uniform diameter. FIG. 3 illustrates an example mold compound tablet 142 having a radial profile (e.g., a circular diameter) with a first surface 302 and a second surface 304 opposite the first surface 302, both of which are generally planar. In the illustrated example, the mold compound tablet 142 has a cylindrical length 306 that extends from the first surface 302 (i.e., normal to the surface 302) to the second surface 304 via its longitudinal axis.

Because the mold compound tablets 142 of the mold system 100 have a substantially uniform diameter, the mold system 100 uses mold compound tablets 142 having different cylindrical lengths to package different types of integrated circuits. For example, in packaging processes to form integrated circuits into a quad flat package having a total area that exceeds 100 square millimeters, the mold system 100 uses mold compound tablets 142 having a diameter of 14 millimeters and a cylindrical length of 14.1 millimeters. In such examples, because the height and the diameter of the example mold compound tablets 142 are substantially equal, thus, the mold compound tablets 142 may be misaligned within the mold system 100.

Referring to FIG. 2, as a result of misaligned mold compound tablets 142, the mold system 100 may become jammed in any number of locations (e.g., the mold compound separator 155, the mold compound transporter 160, etc.). To prevent such jams, a mold compound remover 165 may be implemented in the example mold system 100. In the example of FIG. 2, the mold compound remover 165 is adjacent to the conveyer belt 150. Alternatively or additionally, the mold compound remover 165 may be implemented in any suitable location or device within the mold system 100 (e.g., the mold compound transporter 160, etc).

Figure 4:
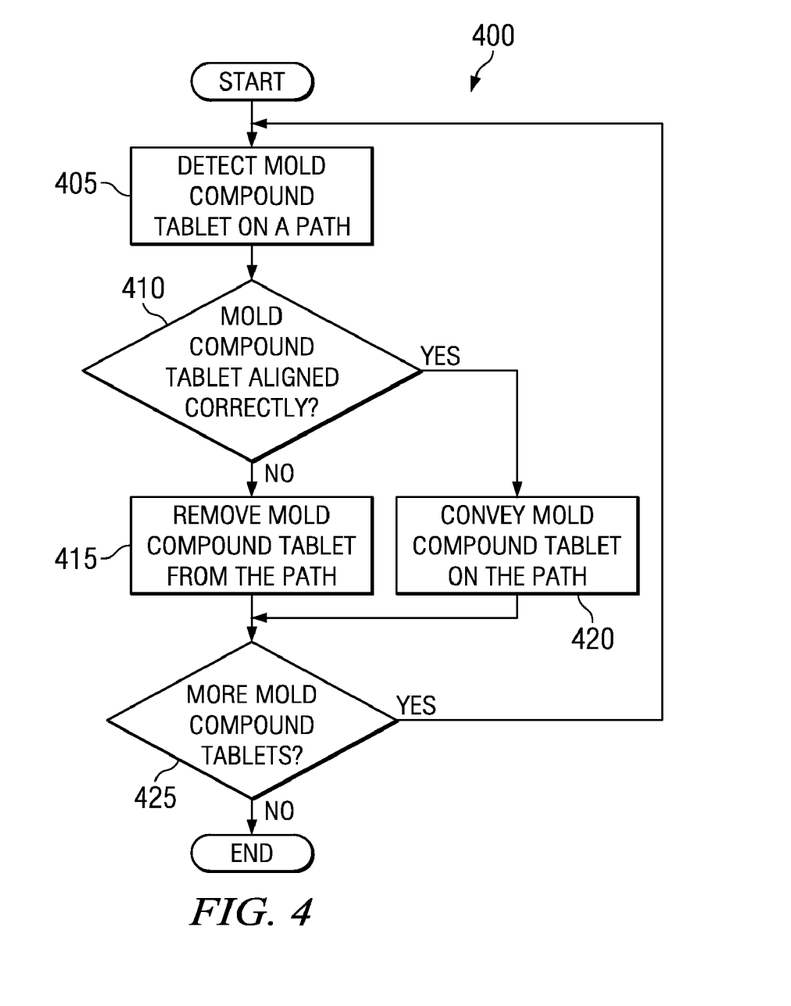
FIG. 4 is a flow diagram of an example process to prevent jamming in a mold compound feeder.

FIG. 4 illustrates an example process 400 that the mold compound remover 165 may implement to prevent misaligned mold compound tablets from jamming the example mold system 100. The example process 400 may be implemented at any stage of operation of the mold system 100 (e.g., preheating, transporting, etc.) and may be implemented by any suitable controller such as, for example, the mold compound remover 165. In other examples, the mold compound remover 165 may be communicatively coupled to the mold system controller 110, which may implement suitable controls to instruct the mold compound remover 165 to remove mold compound tablets 142 from the transfer mold process that are not properly oriented or properly sized.

The example process 400 begins by detecting a mold compound tablet on a path (block 405). The path may be the conveyer belt 150 or any other suitable path (e.g., the mold compound transporter 160, etc.). After detecting the mold compound tablet, the example process 300 determines the alignment of the mold compound tablet (block 410). If the alignment of the mold compound tablet is incorrect (e.g., the longitudinal axis of the mold compound tablet is perpendicular to the path), the mold compound tablet is removed from the path (block 415). If the alignment of the mold compound tablet is correct (e.g., the longitudinal axis of the mold compound tablet is parallel to the path), it is conveyed on the path to other components of the mold system (e.g., a preheater, a transporter, etc.) (block 420).

The alignment of the mold compound tablet may be detected by any suitable process. For example, the alignment of the mold compound tablet may be determined based on a distance between a fixed location from the path and a surface of the mold compound tablet located on the path. Because the fixed location is known and the mold compound tablet is disposed on the path, a height of the mold compound tablets relative to the path may be calculated. The height of the mold compound tablet may be compared to a predetermined value (e.g., a height) indicative of the alignment of the mold compound tablet 142 (e.g., 14 millimeters). If the height of the mold compound tablet exceeds the predetermined value, such as the diameter of the mold compound tablet, then the mold compound tablet is determined to be misaligned (e.g., the longitudinal axis of the mold compound tablet may be perpendicular to the path). Alternatively or additionally, if the height does not exceed the predetermined value, then the mold compound tablet is determined to be properly aligned.

Still, in other examples, the alignment of the mold compound tablet may be determined by measuring the profile of the surface of the mold compound tablet at two or more locations. In such examples, the measured distances are compared to each other. If the measured distances are substantially different, then the surface of the mold compound tablet is determined to be non-linear and the mold compound tablet is properly aligned. Similarly, if the measured distances are substantially equal, then the surface of the mold compound tablet is determined to be linear and the mold compound tablet is misaligned.

Still, in other examples, the height of the mold compound tablet may be measured by, for example, a photoelectric trip circuit that conveys a signal to a receiver based on a height of the mold compound tablets relative to the path. When an object such as a mold compound tablet extends above threshold value and blocks the receiver from receiving the signal, the mold compound tablet is determined to be misaligned.

After the mold compound tablet is conveyed to the remainder of the mold system 100 or after a misaligned mold compound tablet is removed, the example process 400 determines if there is an additional mold compound tablet to be conveyed to the mold system (block 425). If there is an additional mold compound tablet, the example process returns to block 405 and detects the next mold compound tablet. If there are no additional mold compound tablets, the example process 400 ends.

Figure 5:
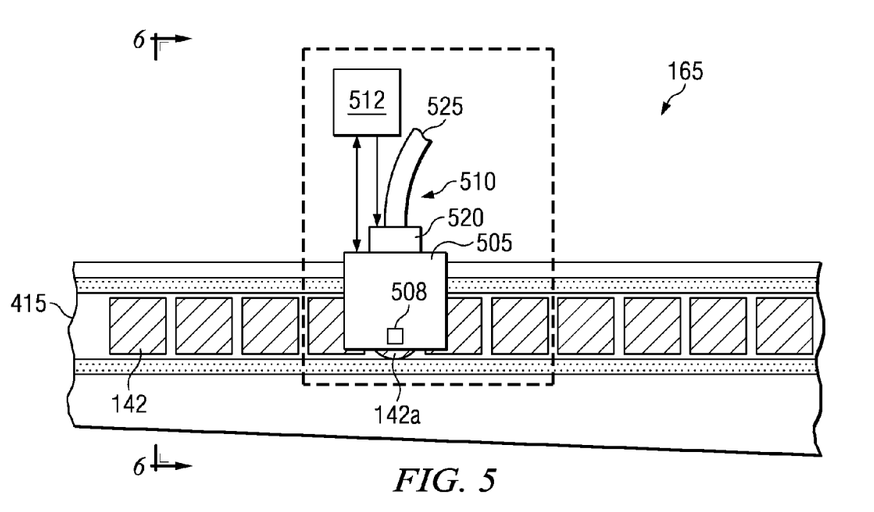
FIG. 5 illustrates an example mold compound remover that may implement the example process of FIG. 4.
Figure 6:
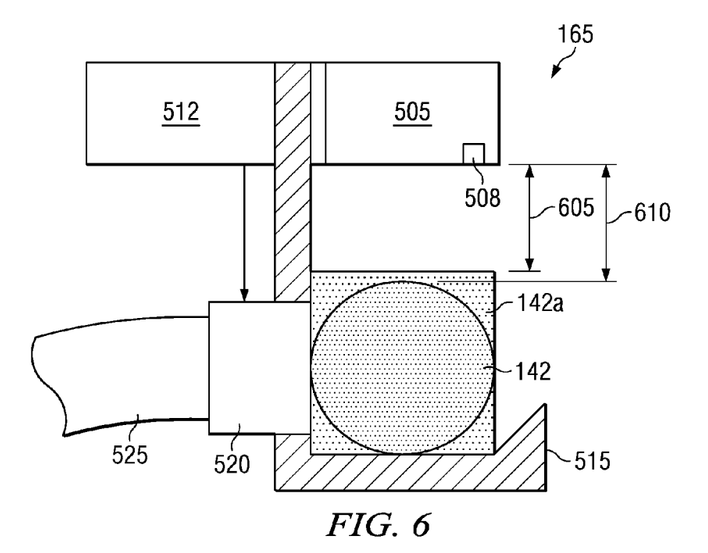
FIG. 6 illustrates a section of the example mold compound remover taken along lines 6-6 of FIG. 5.

FIGS. 5 and 6 illustrate an example mold compound remover 165 in more detail, which implements the example process 400. FIG. 5 is a top view and FIG. 6 is a side view of the mold compound remover 165 taken along lines 6-6 in FIG. 5. In the example of FIG. 5, the mold compound remover 165 is implemented by a mold compound detector 505 having a sensor 508 and a mold compound remover 510. The mold compound detector 505 and the sensor 508 are coupled to a mold compound analyzer 512 that controls the mold compound remover 510. In other examples, the mold compound analyzer 512 may be incorporated into other devices such as, for example, the mold detector 405 or the mold system controller 110.

In the example of FIG. 5, the mold compound tablets 142 are conveyed on a path 515 (e.g., the conveyer belt 150, the mold compound transporter 160, etc.) and should be aligned on their longitudinal axes (e.g., laying on their sides). In the example of FIG. 5, one of the mold compound tablets 142a is misaligned on the path 515. In the example of FIG. 5, the misaligned mold compound tablet 142a is conveyed on the path 515 such that its longitudinal axis is substantially perpendicular to the path 515. The example mold system 100 may experience jam as a result of any misaligned mold compound tablets 142a, creating a need for maintenance of the mold system 100 and halting the transfer mold process.

To prevent such jams, the mold compound detector 505 measures one or more distances to a surface of the mold tablets 142 and the mold compound analyzer 512 determines their respective alignment. In the illustrated example, the sensor 508 (e.g., a machine vision device, a convergent photo sensor, etc.) is disposed above the path 515 and the mold compound detector 505 is configured to determine a distance to a surface of the mold compound tablet 142a disposed beneath the sensor 508. Based on the distance to the mold compound tablet 142a, the mold compound analyzer 512 determines if the mold compound tablet 142a is misaligned. The mold compound analyzer 512 may be implemented by any suitable device (e.g., a logic circuit, a solid state relay, a comparator, a processor executing software instructions, etc.) to determine if the mold compound tablet 142a is misaligned.

In the example of FIG. 6, the sensor 508 measures a first distance 605 between the mold compound detector 505 and a top surface of the mold compound tablet 142a to determine its height. After measuring the distance 605, the mold compound detector 505 conveys the distance 605 to the mold compound analyzer 512, which compares the first distance 605 to a threshold distance 610 (e.g., 14 millimeters) indicative of a properly aligned mold compound tablet 142 on the path 515. In some examples, if the first distance 605 does not exceed the threshold distance 610, the mold compound analyzer 512 determines that the mold compound tablet 142a is aligned on its radial axis (i.e., its longitudinal axis is substantially perpendicular to the path 515). As a result, the mold compound analyzer 512 conveys a fault signal to the mold compound remover 510 to remove the misaligned mold compound tablet 142a. If the first distance 605 exceeds the threshold distance 610, the mold compound analyzer 512 determines that the mold compound tablet 142a is aligned on its longitudinal axis (i.e., the longitudinal axis is substantially parallel to the path 515) and the mold compound tablet 142 is conveyed to the other devices within the example mold system 100.

After receiving the fault signal from the mold compound analyzer 512, the mold compound remover 510 applies a force to the misaligned mold compound tablet 142a to force it off of the path 515, thereby removing the misaligned mold compound tablet 142a from the transfer mold process of the example molding system 100. In the example of FIG. 5, the mold compound remover 510 is disposed on a surface of the mold compound feeder 135, which includes a valve 520 (e.g., a solenoid, a diaphragm, etc.) and an air pressure source (not shown) configured to provide high pressure air via a tube 525. In such examples, the mold compound detector 505 is positioned relative to the mold compound remover 510 such that when the mold compound analyzer 512 detects the misaligned mold compound tablet 142a, the mold compound analyzer 512 conveys the fault signal and the mold compound remover 510 and removes the misaligned mold compound tablet 142a from the path 515.

By default, the valve 520 remains closed, thereby substantially isolating the air pressure from the path 515. In the illustrated example, the fault signal from the mold compound analyzer 512 causes the valve 520 to open, thereby exposing the air pressure difference created by the air pressure source via the tube 525. The force of the air pressure difference removes the mold compound tablet 142a from the path 515, thereby preventing the misaligned mold compound tablet 142a from entering into the remainder of the example mold system 100. As a result, the mold compound remover 165 reduces the possibility of a mold compound tablet jam due to any misaligned mold compound tablets 142a. Although the example mold compound remover 510 is implemented the valve 520 and an air pressure source, the mold compound remover 510 may be implemented by any suitable device that selectively removes the misaligned mold compound tablets 142a from the path 515.

FIG. 6 illustrates the mold compound remover 165 implemented in the mold compound feeder 135 in more detail. In the illustrated example, the path 515 is implemented by the conveyer belt 150 and the mold compound remover 165 is implemented adjacent to the conveyer belt 150 to remove misaligned mold compound tablets 142 conveyed via the conveyer belt 150. In the example of FIG. 6, each of the mold compound tablets 142 are aligned and conveyed on the conveyer belt 150 via their longitudinal axis. As described above, the mold compound detector 505 determines the alignment of the mold compound tablets 142 on the conveyer belt 150. After determining the alignment of the mold compound tablet 142, if the mold compound tablet 142 is not properly aligned (e.g., it is radially aligned), then the mold compound detector 505 actuates the mold compound remover 510 to remove any misaligned mold compound tablets 142a from the conveyer belt 150.

Figure 7:
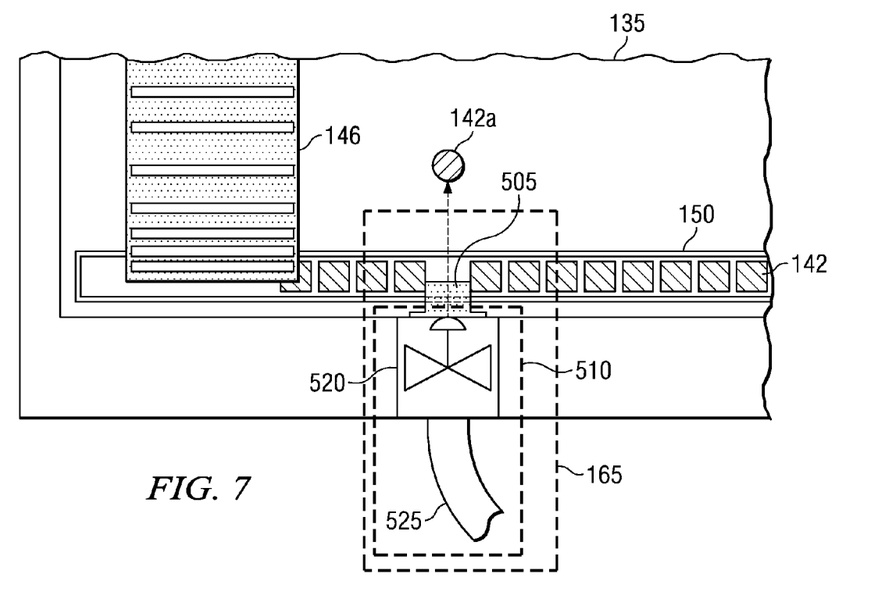
FIG. 7 illustrates the example mold compound remover of FIG. 4 implemented in the example mold compound feeder of FIG. 2 in more detail.

In the example of FIG. 7, the mold compound remover 510 is implemented by an electrically controlled valve 520 (e.g., a solenoid, etc.) coupled with an air pressure source (e.g., a vacuum or a blower) via the tube 425. By removing the misaligned mold compound tablets 142a, the mold compound remover 165 prevents any misaligned mold compound tablets 142 from jamming a downstream device of the mold system 100 (e.g., the mold compound separator 155, the mold compound transport 160, the plunger 130, etc.).

In the illustrated example, the mold compound remover 165 is implemented in the mold feeder 135. However, the mold compound remover 165 may be implemented at any suitable stage or device of the mold system 100. For example, the mold compound remover 165 may be implemented immediately before the mold compound tablet 142 is received by the plunger 130. In other examples, the mold system 100 may implement a plurality of mold compound removers 165 in a plurality of locations throughout the mold system 100.

Figure 8:
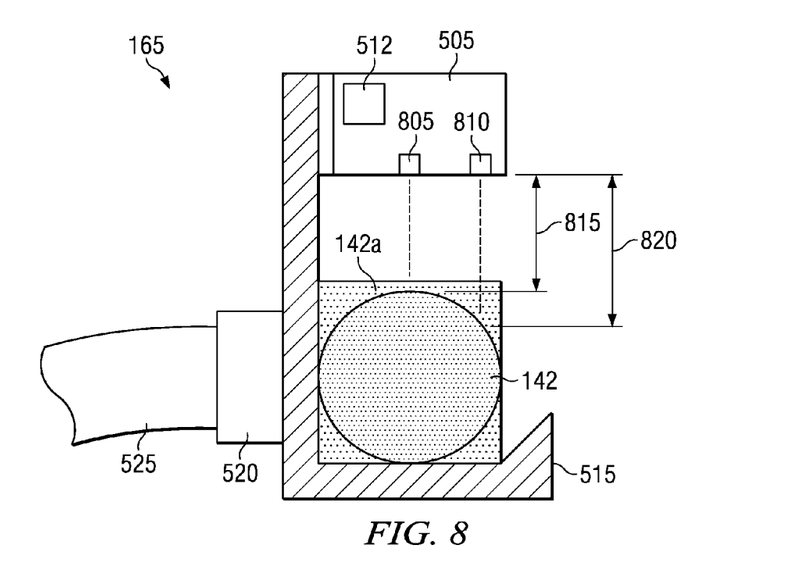
FIG. 8 illustrates another example mold compound remover of FIG. 2 that may implement the example process of FIG. 3.

FIG. 8 illustrates another mold compound remover 165. In the example of FIG. 8, the mold compound detector 505 includes a first sensor 805 and a second sensor 810 to measure a surface of the mold compound tablets 142. In addition, the mold compound detector 505 includes the mold compound analyzer 512. In the illustrated example, the first sensor 805 measures a first distance 815 and the second sensor 810 measures a second distance 820. In the examples described above, the mold compound tablets 142 are cylindrical travel on the path 515 via their longitudinal axis. In such examples, the sensors 805, 810 are configured to measure the radial profile on the mold compound tablets 142.

As a result, if the first and second distances 815, 820 are substantially equal, the mold compound analyzer 512 determines that the surface that it is measuring is substantially linear. In some examples, the mold compound analyzer 512 determines that the mold compound tablet 142a is misaligned (e.g., radially aligned). In such examples, the mold compound analyzer 512 conveys the fault signal to the mold compound remover 510 to remove the misaligned mold compound 142a from the path 515. On the other hand, if the first and second distances 815, 820 are not substantially equal, the mold compound analyzer 512 determines that the surface it is measuring is substantially non-linear, and, thus, the mold compound tablet 142 is properly aligned.

The example mold system 100 of FIGS. 1 and 2 may be implemented by any transfer mold system, for example, a Towa mold system. Mold systems of any equipment manufacturer (e.g., Boschman, etc.) may benefit from the apparatus and methods disclosed herein. By utilizing the example apparatus or methods described above, the mean time between required assists in the Towa mold system have been increased by a factor of 23. As a result, downtime of the example Towa mold system has been decreased from 1.0% to 0.8%, a 20% reduction in downtime. Additionally, by reducing mold compound tablet jamming, the need for mold system operators to insert their hands into the machine is likewise reduced, thereby reducing the risk of injury to the operators. The examples disclosed herein may be adapted to function in various manners. For example, in addition to detecting mold compound tablet alignment, the apparatus and/or methods disclosed herein may be adapted to detect mold tablets having a size or shape outside of a tolerance range to remove mold tablets that would jam the mold system regardless of the alignment of the mold tablet.

Although certain articles of manufacture, methods, and apparatus have been disclosed, the scope of coverage of this patent is not limited thereto. On the contrary, this patent covers all apparatus, methods and articles of manufacture fairly falling within the scope of the appended claims either literally or under the doctrine of equivalents.

What is claimed is:

1. An apparatus to prevent jamming of mold compound tablets in a system to encapsulate integrated circuits, the apparatus comprising:
    a mold compound analyzer to determine if a mold compound tablet has a first alignment on a path of the mold system, wherein the mold compound analyzer is to determine if the mold compound tablet has the first alignment by detecting a first distance to the mold compound tablet; and
    a mold compound remover to remove the mold compound tablet from the path if the mold compound tablet has a second alignment different from the first alignment.

2. The apparatus as defined in claim 1, wherein the mold compound analyzer further comprises a sensor to detect the first distance.

3. The apparatus as defined in claim 1, wherein the mold compound analyzer is to determine the mold compound tablet has the first alignment if the first distance is greater than a second distance and the mold compound tablet has the second alignment if the first distance is substantially equal to or less than the second distance.

4. The apparatus as defined in claim 1, wherein the mold compound analyzer is to determine the mold compound tablet has the first alignment if a second distance is greater than the first distance and the mold compound tablet has the second alignment if the first distance is substantially equal to or less than the second distance.

5. The apparatus as defined in claim 1, wherein the first alignment of the mold compound tablet is a substantially parallel relationship between the path and a longitudinal axis of the mold compound tablet, and wherein the second alignment of the mold compound tablet is a substantially perpendicular relationship between the path and a longitudinal axis of the mold compound tablet.

6. The apparatus as defined in claim 1, wherein the first alignment of the mold compound tablet is a substantially perpendicular relationship between the path and a longitudinal axis of the mold compound tablet, and wherein the second alignment is a substantially parallel relationship between the path and a longitudinal axis of the mold compound tablet.

7. A method to prevent jamming of mold compound tablets in a system to encapsulate integrated circuits, comprising:
    determining if a mold compound tablet has a first alignment on a path, wherein determining if a mold compound tablet has a first alignment comprises determining a first distance to the mold compound tablet; and
    removing the mold compound tablet from the path if the mold compound tablet has a second alignment different from the first alignment.

8. The method as defined in claim 7, wherein determining the first distance to the mold compound tablet further comprises determining the distance between a mold compound detector and a surface of the mold tablet.

9. The method as defined in claim 8, wherein the mold compound tablet has the first alignment if the first distance is greater than a second distance and the mold compound has the second alignment if the first distance is substantially equal to or less than the second distance.

10. The method as defined in claim 8, wherein the mold compound tablet has the first alignment if a second distance is greater than the first distance and the mold compound tablet has the second alignment if the second distance is substantially equal to or less than the first distance.

11. The method as defined in claim 7, wherein the first alignment of the mold compound tablet is on a longitudinal axis, and wherein the second alignment of the compound is on a radial axis.

12. The method as defined in claim 7, wherein the first alignment of the mold compound tablet is a substantially perpendicular relationship between the path and a longitudinal axis of the mold compound tablet, and wherein the second alignment is a substantially parallel relationship between the path and a longitudinal axis of the mold compound tablet.

13. An apparatus to prevent jamming of mold compound tablets in a system to encapsulate integrated circuits, comprising:
    a first sensor to detect a first distance to a first surface of a mold compound tablet on a path in the system;

a second sensor to measure a second distance to the first surface of the mold compound tablet a mold compound analyzer to convey a fault signal based on a comparison of the first distance to the second distance; and a mold compound remover to selectively remove the mold compound tablet from the path based on the fault signal.

14. The apparatus as defined in claim 13, wherein the mold compound analyzer is to convey the fault signal if the first distance exceeds the second distance.

15. The apparatus as defined in claim 14, wherein the second distance is indicative of the alignment of the mold compound tablet.

16. The apparatus as defined in claim 13, wherein the mold compound analyzer is to determine if the first surface of the mold compound tablet is a non-linear surface.

17. The apparatus as defined in claim 16, wherein the mold compound analyzer is to determine the first surface is non-linear if the first and second distances are substantially different.

* * * * *